US007936692B1

(12) United States Patent
Jacobs et al.

(10) Patent No.: US 7,936,692 B1
(45) Date of Patent: May 3, 2011

(54) METHOD AND SYSTEM FOR CONCATENATION OF DELAY PERCENTILES

(75) Inventors: Philip Jacobs, Windham, NH (US); Yifang Zhuang, Boxborough, MA (US); Morgan Littlewood, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 1030 days.

(21) Appl. No.: 11/138,759

(22) Filed: May 26, 2005

(51) Int. Cl.
*G01R 31/08* (2006.01)
(52) U.S. Cl. .................... 370/252; 370/231; 370/235
(58) Field of Classification Search .............. 370/229, 370/231, 232, 235, 241, 248, 249, 252, 223, 370/224
See application file for complete search history.

(56) References Cited

U.S. PATENT DOCUMENTS

| 6,226,266 | B1 * | 5/2001 | Galand et al. ............... 370/235 |
| 7,024,475 | B1 * | 4/2006 | Abaye et al. ............... 709/224 |
| 7,349,985 | B2 * | 3/2008 | Gilmartin et al. ............ 709/242 |
| 7,391,731 | B1 * | 6/2008 | Skelly et al. ............... 370/238 |
| 2004/0071095 | A1 * | 4/2004 | Raisanen .................. 370/252 |
| 2005/0083840 | A1 * | 4/2005 | Wilson .................... 370/230 |

OTHER PUBLICATIONS

Morton, A.C., "Proposed New Appendix XI/Y.1541 on Concatenating QoS Calues," ITU Telecommunication Standardization Sector, Study Group: 13, Working Party 4, Feb. 3-12, 2004.*
Morton, A.C., "Revised Version of Rec Y.1541, Network Performance Objectives for IP-based Services," ITU Telecommunications Standardization Sector, Study Group 13, Working Party 4, Jun. 16-17, 2004.*
Morton, A.C., "Analysis of Jitter Concatenation Methods for Revised Y.1541," ITU Telecommunication Standardization Sector, Study Group 12, Working Party 3, Jan. 18-27, 2005.*
"A Proposed Method for the Accumulation of End-to-End Delay Variation," ITU Telecommunication Standardization Sector, Study Period 2001-2004, Study Group 12—Delayed Contribution 196, COM 12-D196-E, Mar. 2004.
Morton, A.C., "Proposed New Appendix XI/Y.1541 on Concatenating QoS Values," ITU Telecommunication Standardization Sector, Study Group: 13, Working Party 4, Feb. 3-12, 2004.

* cited by examiner

*Primary Examiner* — Derrick W Ferris
*Assistant Examiner* — Peter Cheng
(74) *Attorney, Agent, or Firm* — Hamilton, Brook, Smith & Reynolds, P.C.

(57) ABSTRACT

A method of estimating end-to-end delay performance at an end-to-end delay percentile of interest for a network having two or more network segments includes measuring a delay performance level for each network segment at a corresponding network segment delay percentile and concatenating the measured performance levels by summing to provide an estimate value indicative of end-to-end delay performance. A network segment delay percentile may be selected for each network segment for a particular end-to-end delay percentile of interest, error band, and number of segments. Selection may result in using the same network segment delay percentile for all network segments, or, selecting individual network segment delay percentiles for each network segments, or selecting a first network segment delay percentile for a particular network segment having a largest range of delay relative to the other network segments and selecting a second network segment delay percentile for other segments.

41 Claims, 4 Drawing Sheets

METHOD AND SYSTEM FOR CONCATENATION OF DELAY PERCENTILES

BACKGROUND

To be able to measure with scalability among possibly millions of endpoints, a communications network can be segmented such that every segment measurement is highly leveraged. High delay percentile metrics are known to be good indicators of network performance. Unfortunately, there is no simple way known to estimate end-to-end high delay percentiles given concatenated network percentiles for arbitrary delay distributions.

The definition of network performance objectives is becoming increasingly important as Internet Protocol (IP)-based services are more widely deployed in service provider networks. The ITU-T Recommendation Y.1541, entitled "Network Performance Objectives for IP-based Services," defines classes of network Quality of Service (QoS), and specifies objectives for IP network performance parameters. The Recommendation Y.1541 is currently under revision to consider providing rules for using measurements of segments of a path and combining the measured values to estimate the User-Network Interface (UNI) to UNI IP performance.

One of the more difficult performance parameters to estimate on an end-to-end basis is the IP Packet Delay Variation (IPDV), also referred to as jitter. The IPDV for a particular percentile delay is defined as follows:

$DV_{99.9} = 99.9^{th}$ percentile delay–reference $DV_{99.8} = 99.8^{th}$ percentile delay–reference etc.

where "reference" can be the mean or minimum delay. It has been difficult to estimate the end to end percentile delay from segment delay percentiles.

In Y.1541, a proposed tabular method suggests the number of segments of a given delay variation that are allowed such that a 50 ms IPDV objective can be met. Put another way, this tabular method provides suggested requirements on how to meet a single end-to-end IPDV value by limiting the IPDV for various numbers of segments. This tabular approach is not very flexible. For example, since the current table is based on a 50 ms IPDV objective, to determine whether a 40 ms IPDV objective has been met would require creating a new table. Another approach proposes an approximation method for combining the quantiles and the third central moments of the delay variation of path segments into the desired end-to-end values. This latter approach is mathematically complex and considered unworkable.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

In accordance with the present approach, an estimate of end-to-end delay percentile can be provided by summing particular network segment delay percentiles, for a constrained set of delay distributions. Investigation suggests that the present approach obtains better results using a constraint whereby P99.9/Mean of the delay distribution is less than some upper bound, for example 3.2. Here the term P99.9 indicates the $99.9^{th}$ percentile of delay. The present approach provides an easily understood and robust method that uses a relatively small amount of data from each network segment and requires very little processing to estimate end-to-end QoS measurement from multiple network segments. This approach is more flexible than the known tabular method, as it can be used to estimate multiple end-to-end delay percentiles based upon particular network segment delay percentiles.

A method of estimating end-to-end delay performance at an end-to-end delay percentile of interest for a network having two or more network segments includes measuring a delay performance level for each network segment at a corresponding network segment delay percentile and concatenating the measured performance levels by summing to provide an estimate value indicative of end-to-end delay, derivative performance estimate for other metrics such as delay variation can then also be obtained. It should be noted that, while embodiments of the methodology described herein relate in particular to estimating end-to-end IP Packet Delay Variation (IPDV) or jitter, the approach may also be suitable for additional metrics that rely upon the concatenation of high percentiles.

A network segment delay percentile may be selected for each network segment for a particular end-to-end delay percentile of interest, error band, and number of segments. The selecting may include selecting the same network segment delay percentile for all network segments based on the particular end-to-end delay percentile of interest, error band, and number of segments, or selecting each network segment delay percentile based on the total number of network segments, error band and the particular end-to-end delay percentile of interest, or selecting a first network segment delay percentile for a particular network segment having a largest delay relative to the other network segments and selecting a second network segment delay percentile for the other segments. The delay performance measurement may be one-way or round-trip.

Figure 1:
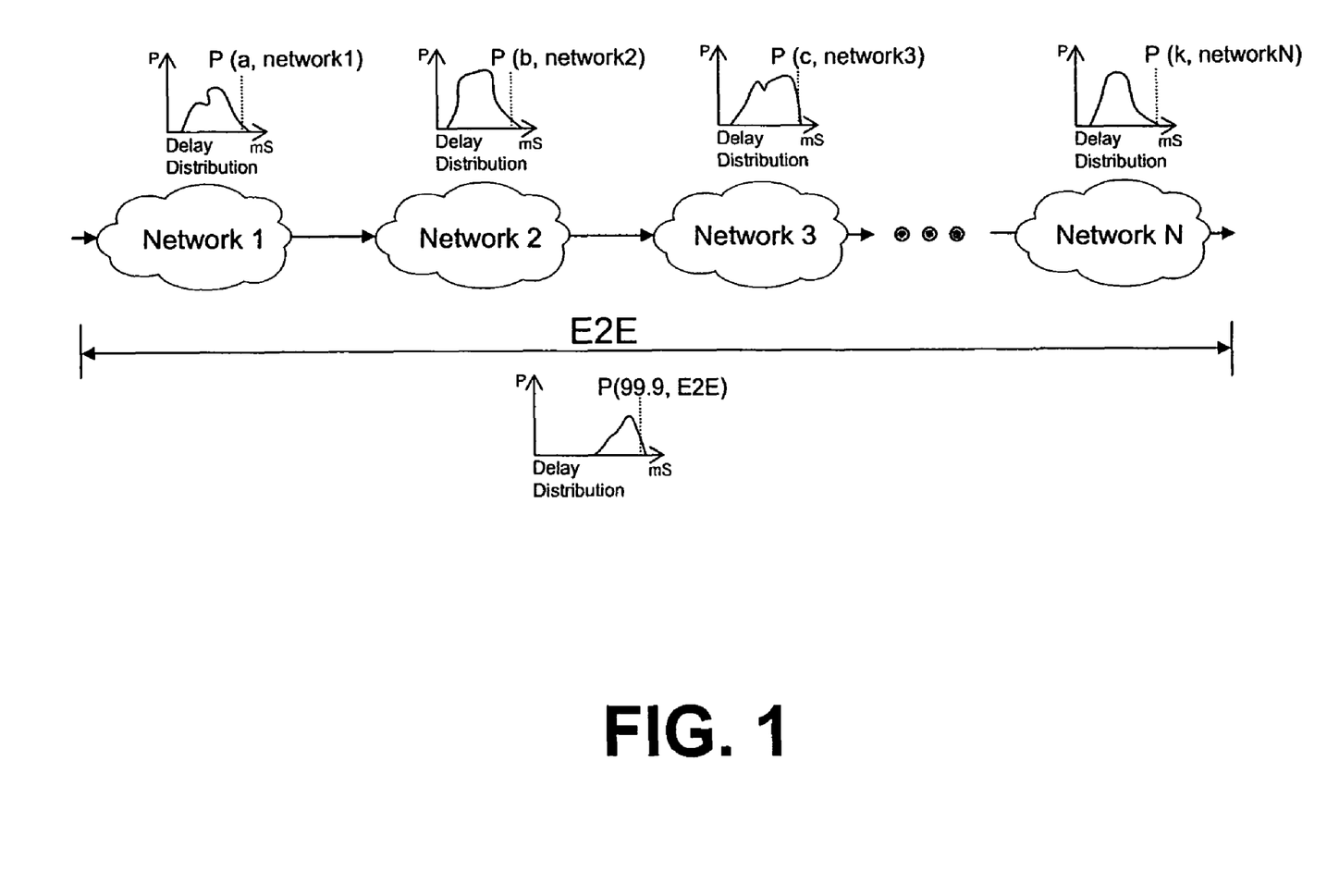
FIG. 1 illustrates concatenation of network segment delay percentiles according to principles of the present approach.

FIG. 1 shows an end-to-end (E2E) network of connected network segments Network 1, Network 2, Network 3, . . . , Network N for providing communications services. Shown above each network is a corresponding delay distribution function P(a, network) where the first parameter represents a particular percentile and the second parameter represents the network or network segment over which the delay is measured.

There is also shown an end-to-end delay distribution for the end-to-end connected network segments.

As estimate of an end-to-end percentile can be generated by summing particular network percentiles, expressed as follows:

P(x, E2E)~P(a, network1)+P(b, network2)+P(c, network3)+ . . . P(k, networkN)

The estimate requires that a single particular percentile value (a, b, c, . . . , k) for each network be taken. From that set of values, an estimate for a particular end-to-end percentile x of interest (e.g., $99.9^{th}$) is made from the summing operation. This method may or may not require that the relative magnitude of delay distributions be taken into account in the estimation.

The value of the 99.9th percentile is given as an example; it should be understood that the method is applicable to a range of end-to-end percentiles. The method uses a set of percentiles for each particular end-to-end percentile of interest. A single measurement is required from each segment for each set.

Figure 2:
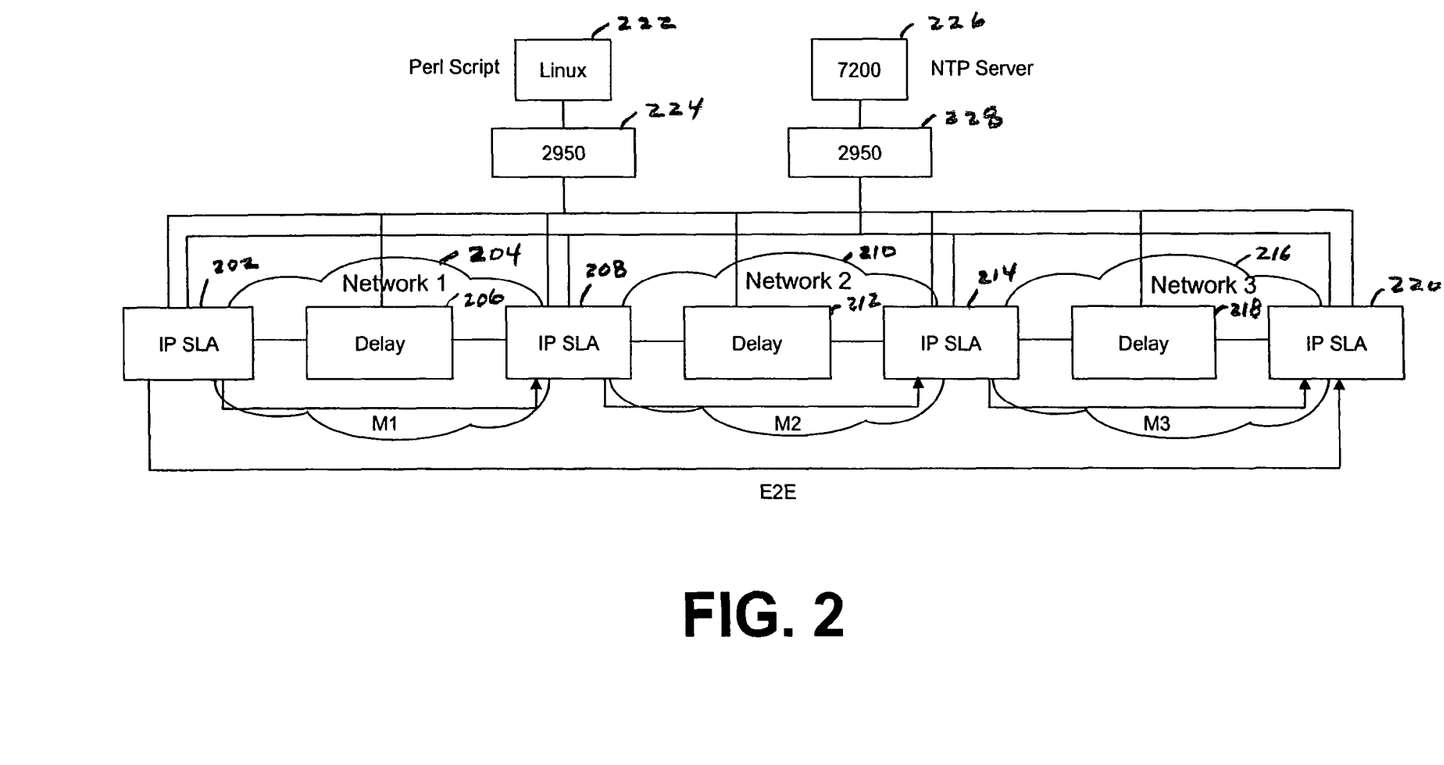
FIG. 2 is a schematic diagram illustrating a test configuration for delay measurements.

To derive particular network segment delay percentiles for possible end-to-end percentiles of interest, a test configuration using equipment representing three concatenated network segments was examined as shown in FIG. 2. It should be understood that different configurations, methods and approaches can be used to find useful, particular network segment delay percentiles. That is, the test configuration of FIG. 2 is one of several methods.

In particular, the test configuration equipment of FIG. 2 provided probe generation, programmable delay and measurement capabilities. Probe generation and measurement units 202, 208, 214, 220 were used to provide generation of test probes and one-way delay measurements. Programmable delay units 206, 212, 218 were used to simulate delay variation through each network segment 204, 210, 216. The probe generation/measurement units 202, 208, 214, 220 and the delay units 206, 212, 218 used in the configuration were Cisco 3640 series routers.

"IP SLA" is a tool available from Cisco Systems that was used for the probe generation and one-way delay measurement. IP SLA is a portfolio of technology embedded in most devices that run Cisco IOS software, which allows analysis of IP service levels for IP applications and services. IP SLA uses active traffic monitoring—the generation of traffic in a continuous, reliable, and predictable manner—for measuring network performance. Using IP SLA, service provider customers can measure and provide service level agreements, and enterprise customers can verify service levels, verify outsourced service level agreements, and understand network performance. IP SLA can perform network assessments, verify quality of service (QOS), ease the deployment of new services, and assist administrators with network troubleshooting. IP SLA can be accessed using the Cisco IOS command-line interface (CLI) or Simple Network Management Protocol (SNMP) (through the Cisco Round-Trip Time Monitor [RTTMON] and SYSLOG Management Information Bases [MIBs]).

Cisco IOS IP SLA sends data across the network to measure performance between multiple network locations or across multiple network paths. It simulates network data and IP services, and collects network performance information in real time. The information collected includes data about response time, one-way latency, jitter (interpacket delay variance), packet loss, voice quality scoring, network resource availability, application performance, and server response time. IP SLA performs active monitoring by generating and analyzing traffic to measure performance either between Cisco IOS devices or from a Cisco IOS device to a remote IP device such as a network application server. Measurement statistics provided by the various IP SLA operations can be used for troubleshooting, for problem analysis, and for designing network topologies.

In this test configuration, all the probes generated have the same characteristics: UDP Jitter Probe; Probe Size of 200 Octets; Probe Frequency of 1 per second. A typical configuration of the routers generating probes 202, 208, 214 running IP SLA follows:

ip sla monitor 1 type jitter dest-ipaddr 1.1.1.31 dest-port 2222 num-packets 1 request-data-size 200 (data size 200 Octets)

timeout 1000 (millisecond)

precision microseconds probe-packet priority high clock-tolerance ntp oneway absolute 5000 frequency 1 (Each Probe was launched every 1 second)

ip sla monitor schedule 1 life 3650 start-time 20:45:00

A typical configuration of the routers receiving probes 208, 214, 220 running IP SLA follows:

ip sla monitor responder

In order to retrieve the measurement data, a Perl script was run from Linux 222 through telnet to issue a command every one second to collect the result and save it in a file. The "sh ip sla monitor operational-state" EXEC command was used.

In the test configuration, delay insertion for different delay ranges and distributions with different shapes was achieved via Cisco's "Passthru MODify", aka "PMOD" tool running on the routers 206, 212, 218. Delay can be programmed by either configuration or from a file.

One-way delay measurement requires the clocks on source and target routers to be synchronized. The measurement accuracy will depend upon correct time synchronization. Network Time Protocol (NTP) is a protocol to synchronize clients over an IP network. All measurement routers 202, 208, 214, 220 were synchronized with a server (a Cisco 7200 router) 226 using NTP. Each router included a dedicated clock sync interface connected with the NTP server.

Four probes denoted M1, M2, M3 and E2E were launched at the same time from the source routers to target routers as shown in FIG. 2. That is, probe M1 sent from router 202 to router 208 through programmable delay 206; probe M2 sent from router 208 to router 214 through programmable delay 212; probe M3 sent from router 214 to router 220 through programmable delay 218; and probe E2E sent from router 202 to router 220 through delay 206, router 208, delay 212, router 214, delay 218.

Each test was run for 1 hour (3600 of each measurement). Longer runs were tried and they gave similar results.

All measurement (IP SLA) routers 202, 208, 214, 220 and delay routers 206, 212, 218 used switched Fast Ethernet connectivity. All control and NTP communications used switched Ethernet connectivity based on Cisco Catalyst 2950 Series switches 224, 228.

Having described the equipment used in the test configuration, it is now helpful to consider the delay distributions and delay ranges that were used with the test configuration. Delay distributions in networks are often heavy-tailed distributions, with some approximating Gamma distribution, and some being bi-modal or multi-modal. The delay distributions used reflect these widely observed distributions by including Gamma and bi-modal distributions. Furthermore, since it is desirable to have a robust metric for estimating end-to-end IPDV, normal and uniform distributions were also included.

Combinations of Gamma, Bimodal, Uniform, and Normal distributions were each used to generate delays in network1, network2, and network3. The following six different ranges with different shapes of distributions were analyzed:

TABLE 1

Delay Ranges Used

|  | Min (ms) | Max (ms) |
| --- | --- | --- |
| Delay Range 1 | 2 | 20 |
| Delay Range 2 | 20 | 40 |
| Delay Range 3 | 40 | 60 |
| Delay Range 4 | 60 | 80 |
| Delay Range 5 | 80 | 100 |
| Delay Range 6 | 100 | 120 |

The above delay ranges were used for all distributions. Additional delay ranges were also used for Gamma and Normal distributions as follows:

TABLE 2

Additional Delay Ranges Used for Gamma Distribution

|  | Min (ms) | Max (ms) |
| --- | --- | --- |
| Gamma 7 | 3 | 22 |
| Gamma 8 | 10 | 35 |
| Gamma 9 | 18 | 45 |
| Gamma 10 | 25 | 60 |
| Gamma 11 | 30 | 70 |
| Gamma 12 | 40 | 80 |
| Gamma 13 | 50 | 90 |
| Gamma 14 | 60 | 100 |
| Gamma 15 | 60 | 120 |
| Gamma 16 | 80 | 130 |
| Gamma 17 | 20 | 290 |

TABLE 3

Additional Delay Ranges Used for Normal Distribution

|  | Min (ms) | Max (ms) |
| --- | --- | --- |
| Normal 7 | 5 | 15 |
| Normal 8 | 0 | 25 |
| Normal 9 | 45 | 55 |
| Normal 10 | 35 | 65 |
| Normal 11 | 20 | 80 |
| Normal 12 | 0 | 100 |
| Normal 13 | 50 | 150 |
| Normal 14 | 2 | 210 |

For many combinations of distributions and delay ranges, there was a search made for network percentile sets that produced lower errors.

To evaluate the test results, an error percentage was examined as follows given a percentile of interest equal to 99.9:

Error %=$(P(a,\text{network1})+P(b,\text{network2})+P(c,\text{network3})-P(99.9,\text{E2E}))*100/P(99.9,\text{E2E})$ The following table shows some example measurements with their respective estimation error percentage:

TABLE 4

Example data for P (99.9, E2E) ~ P (a, network1) + P (b, network2) + P (c, network3)

| Test | a | M1 (us) | b | M2 (us) | c | M3 (us) | 99.9 | E2E (us) | Error % |
| --- | --- | --- | --- | --- | --- | --- | --- | --- | --- |
| U1_U3_U6 | 96 | 20000.5 | 97 | 59981.8 | 98 | 120096 | 99.9 | 197500.5 | 1.31 |
| N3_N2_N6 | 97 | 55878.9 | 98 | 36567 | 98 | 116728.9 | 99.9 | 207271.5 | 0.92 |
| G5_G1_G6 | 98 | 96710.8 | 97 | 15493.2 | 97 | 115016.2 | 99.9 | 228114.2 | −0.39 |
| B6_B6_B6 | 98 | 121539.9 | 98 | 122699.8 | 98 | 12166.9 | 99.9 | 363295.8 | 0.72 |
| U1_N1_G1 | 97 | 20169.9 | 97 | 13707.9 | 97 | 17705.6 | 99.9 | 51898 | −0.61 |

In the "Test" column, the distributions are indicated by U: Uniform, N: Normal, G: Gamma, B: Bimodal. The delay ranges are indicated by 1: (2 ms~20 ms), 2: (20 ms~40 ms), 3: (40 ms~60 ms), 4: (60 ms~80 ms), 5: (80 ms~100 ms), 6: (100 ms~120 ms). For example, U1 stands for Uniform Distribution with Delay Range of 2 ms~20 ms.

Figure 3:
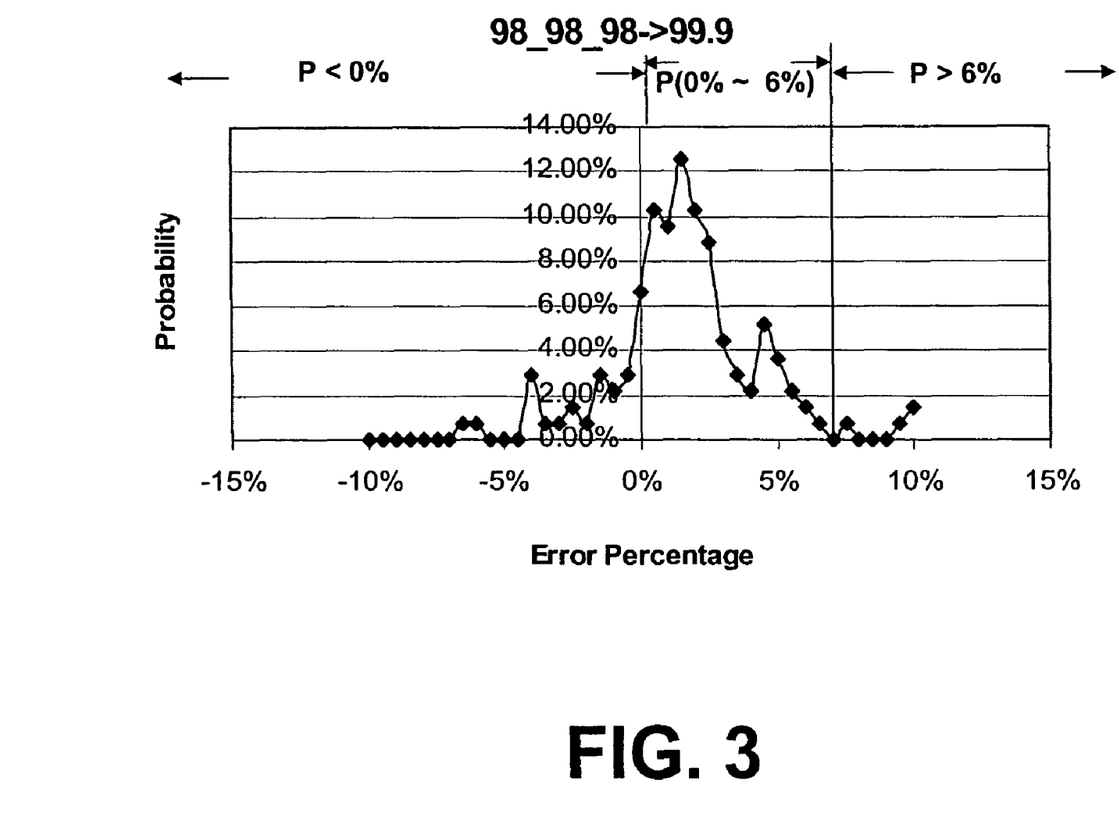
FIG. 3 illustrates scoring of a sample error plot.

To develop a scoring method to apply to candidate sets from the test results, it was considered that 1) it is preferable to overestimate rather than underestimate (so errors greater than 0 are preferred) and 2) errors within a narrow range are preferred. By looking at many error plots it was found by observation that many plots showed a peak within an error range (also referred to herein as an "error band") of 0%-6%. Thus, a scoring approach was used as follows:

Score=$P(0\%\sim6\%)/(P<0\%+P>6\%)$

Where "P (0%~6%)" is the probability of errors between the range 0%~6%. Note that this score can also be written as $P(0\%\sim6\%)/(1-P(0\%\sim6\%))$. An example plot is shown in FIG. 3, which shows an error plot for the set P98+P98+P98, and delineates the sections for P<0%; P>6%; and P (0%~6%).

In addition to searching for sets of segment percentiles that provide a good estimate for an end-to-end 99.9 percentile, results were searched for several high percentiles. Investigation so far suggests the following segment percentiles be used to estimate these particular E2E percentiles by simple addition. Where the same percentile is used for each network segment.:

TABLE 5

Results for three network segments using same network segment percentiles

| E2E Percentile | Network1, Network2, Network3 Percentiles | Score (0%~6%) | P(0%~6%) |
| --- | --- | --- | --- |
| 99.9 | 98.4 + 98.4 + 98.4 | 3.64 | 78.45% |
| 99.8 | 97.6 + 97.6 + 97.6 | 5.95 | 85.61% |
| 99.7 | 96.5 + 96.5 + 96.5 | 5.38 | 84.33% |
| 99.6 | 96.2 + 96.2 + 96.2 | 5.65 | 84.96% |
| 99.5 | 95.5 + 95.5 + 95.5 | 5.12 | 83.66% |
| 99.4 | 95.4 + 95.4 + 95.4 | 5.12 | 83.66% |
| 99.3 | 94.8 + 94.8 + 94.8 | 4.67 | 82.36% |
| 99.2 | 94.8 + 94.8 + 94.8 | 5.65 | 84.96% |
| 99.1 | 94.5 + 94.5 + 94.5 | 5.12 | 83.66% |
| 99.0 | 93.8 + 93.8 + 93.8 | 5.38 | 84.33% |

A score of 4.0 indicates that 80% of the errors occur in the desired range. This seems like a good goal and is proposed as a target.

A fairly broad range of delay distributions and delay ranges were used to test the hypothesis. A scoring method was proposed as a metric to select candidate sets, and a target was set. Analysis of the scores shows that sets of segment percentiles can be found which concentrate the errors into a fairly narrow, conservative band. It should be understood that scoring may be based upon other error ranges and error % distributions. Another approach includes selecting a first network segment delay percentile for the particular network segment having the largest delay relative to the other network segments and selecting a second percentile for the other segments. Investigation shows better scores and suggests the following segment percentiles be used:

TABLE 6

Results for three network segments using a percentile for the segment with the largest relative delay and a different percentile for the other segments.

| E2E Percentile | Network1, Network2, Network3 Percentiles | Score (0%~6%) | P(0%~6%) |
|---|---|---|---|
| 99.9 | 99.7 + 97.4 + 97.4 | 5.38 | 84.31% |
| 99.8 | 99.3 + 96.0 + 96.0 | 11.75 | 92.16% |
| 99.7 | 98.9 + 95.0 + 95.0 | 10.77 | 91.50% |
| 99.6 | 98.8 + 94.5 + 94.5 | 8.56 | 89.54% |
| 99.5 | 98.6 + 94.0 + 94.0 | 8.00 | 88.89% |
| 99.4 | 98.5 + 94.0 + 94.0 | 8.56 | 89.54% |
| 99.3 | 98.2 + 93.0 + 93.0 | 7.50 | 88.24% |
| 99.2 | 98.2 + 93.0 + 93.0 | 8.56 | 89.54% |
| 99.1 | 98.0 + 93.0 + 93.0 | 8.00 | 88.89% |
| 99.0 | 97.8 + 92.0 + 92.0 | 9.20 | 90.20% |

While the test configuration was based on using three network segments, other similar testing can be done to derive candidate sets for other networks, such as those having two, four or more network segments. For example, for a two segment network, investigation so far suggests the following segment percentiles be used to estimate particular E2E percentiles:

TABLE 7

Results for two network segments using same network segment percentiles

| E2E Percentile | Network1, Network2, Percentiles | Score (0%~6%) | P(0%~6%) |
|---|---|---|---|
| 99.9 | 99.6 + 99.6 | 3.33 | 76.92% |
| 99.8 | 99.4 + 99.4 | 5.50 | 84.62% |
| 99.7 | 99.4 + 99.4 | 5.96 | 85.64% |
| 99.6 | 99.3 + 99.3 | 5.50 | 84.62% |
| 99.5 | 99.0 + 99.0 | 7.13 | 87.69% |
| 99.4 | 98.7 + 98.7 | 6.50 | 86.67% |
| 99.3 | 98.7 + 98.7 | 6.80 | 87.18% |
| 99.2 | 98.6 + 98.6 | 8.29 | 89.23% |
| 99.1 | 98.5 + 98.5 | 8.75 | 89.74% |
| 99.0 | 98.4 + 98.4 | 7.48 | 88.21% |

From the foregoing, three general approaches or methods can be used to estimate E2E delay. The first method (as illustrated in Tables 5 and 7) can be defined as using the same percentile for all network segments. The following table shows the more generalized form of this approach, whereby a particular network percentile to request, given a desired error band, a desired E2E delay percentile and a particular number of network segments, may be specified (it should be understood that unpopulated values in the table can be derived using the methodology described above or by other approaches):

TABLE 8

Look-up table for N network segments using same network segment percentiles

| Desired Error Band | Desired E2E Delay Percentile | Percentile to request for 2 segments | Percentile to request for 3 segments | ... | Percentile to request for n segments |
|---|---|---|---|---|---|
| 0~6% | 99.9 | 99.6 | 98.4 | | |
| | 99.8 | 99.4 | 97.6 | | |
| | 99.7 | 99.4 | 96.5 | | |
| | 99.6 | 99.3 | 96.2 | | |
| | 99.5 | 99.0 | 95.5 | | |
| | 99.4 | 98.7 | 95.4 | | |
| | 99.3 | 98.7 | 94.8 | | |
| | ... | | | | |
| −2~4% | 99.9 | | | | |
| | 99.8 | | | | |
| | 99.7 | | | | |
| | 99.6 | | | | |
| | 99.5 | | | | |
| | 99.4 | | | | |
| | 99.3 | | | | |
| | ... | | | | |
| ... | 99.9 | | | | |
| | 99.8 | | | | |
| | 99.7 | | | | |
| | 99.6 | | | | |
| | 99.5 | | | | |
| | 99.4 | | | | |
| | 99.3 | | | | |
| | ... | | | | |

The second method as illustrated by Table 6 can be defined as using a first network segment percentile that is highest for that network segment having the largest delay distribution and otherwise using a second network segment percentile for each of the remaining network segments. This is beneficial if the 99.9 percentiles of delay distributions among segments differ widely. This is more complicated than Table 8, but gives greater confidence for the estimate. This is shown generally as follows:

TABLE 9

Look-up table N network segments using possibly different percentiles for highest and other segments

| Desired Error Band | Desired E2E Delay Percentile | Percentiles to request for 2 segments | | Percentiles to request for 3 segments | | ... | | Percentiles to request for n segments | |
|---|---|---|---|---|---|---|---|---|---|
| | | Higher | Other | Highest | Others | Highest | Others | Highest | Others |
| 0~6% | 99.9 | | | 99.7 | 97.4 | | | | |
| | 99.8 | | | 99.3 | 96.0 | | | | |
| | 99.7 | | | 98.9 | 95.0 | | | | |
| | 99.6 | | | 98.8 | 94.5 | | | | |
| | 99.5 | | | 98.6 | 94.0 | | | | |
| | 99.4 | | | 98.5 | 94.0 | | | | |
| | 99.3 | | | 98.2 | 93.0 | | | | |
| | ... | | | | | | | | |

TABLE 9-continued

Look-up table N network segments using possibly different percentiles for highest and other segments

| Desired Error Band | Desired E2E Delay Percentile | Percentiles to request for 2 segments | | Percentiles to request for 3 segments | | ... | | Percentiles to request for n segments | |
|---|---|---|---|---|---|---|---|---|---|
| | | Higher | Other | Highest | Others | Highest | Others | Highest | Others |
| −2~4% | 99.9 | | | | | | | | |
| | 99.8 | | | | | | | | |
| | 99.7 | | | | | | | | |
| | 99.6 | | | | | | | | |
| | 99.5 | | | | | | | | |
| | 99.4 | | | | | | | | |
| | 99.3 | | | | | | | | |
| | ... | | | | | | | | |
| ... | 99.9 | | | | | | | | |
| | 99.8 | | | | | | | | |
| | 99.7 | | | | | | | | |
| | 99.6 | | | | | | | | |
| | 99.5 | | | | | | | | |
| | 99.4 | | | | | | | | |
| | 99.3 | | | | | | | | |
| | ... | | | | | | | | |

The third method or approach can be defined as using different network segment percentiles based upon a relative ranking of the segment percentiles. This approach is illustrated as follows:

example, using −2~4% or −3~3% would likely result in errors distributed around the actual E2E percentile. Selection of a wider error band would likely increase the probability that more measurements will fall within that wider error band.

TABLE 10

Look-up table N network segments using possibly different percentiles for each segment based upon relative ranking

| Desired Error Band | Desired E2E Delay Percentile | Percentiles to request for 2 segments | | Percentile to request for 3 segments | | | ... | | Percentile to request for n segments | | |
|---|---|---|---|---|---|---|---|---|---|---|---|
| | | H | L | H | M | Lo | H | ... L | Highest | ... | Lowest |
| 0~6% | 99.9 | | | | | | | | | | |
| | 99.8 | | | | | | | | | | |
| | 99.7 | | | | | | | | | | |
| | 99.6 | | | | | | | | | | |
| | 99.5 | | | | | | | | | | |
| | 99.4 | | | | | | | | | | |
| | 99.3 | | | | | | | | | | |
| | ... | | | | | | | | | | |
| −2~4% | 99.9 | | | | | | | | | | |
| | 99.8 | | | | | | | | | | |
| | 99.7 | | | | | | | | | | |
| | 99.6 | | | | | | | | | | |
| | 99.5 | | | | | | | | | | |
| | 99.4 | | | | | | | | | | |
| | 99.3 | | | | | | | | | | |
| | ... | | | | | | | | | | |
| ... | 99.9 | | | | | | | | | | |
| | 99.8 | | | | | | | | | | |
| | 99.7 | | | | | | | | | | |
| | 99.6 | | | | | | | | | | |
| | 99.5 | | | | | | | | | | |
| | 99.4 | | | | | | | | | | |
| | 99.3 | | | | | | | | | | |
| | ... | | | | | | | | | | |

To use the methods described herein, the service provider chooses which table to use. One consideration in selecting the table to use is to check the following condition (condition 1): whether the upper bound of the distribution metric, P99.9/Mean<some upper bounding number (for example 3.2), on all segments. The target error band is also selected (target 1). With the test configurations, an error band of 6% (from 0~6%) gave good results. In general, the error band may be moved or the width varied to best reflect business needs. For If condition 1 is not met, or target 1 is desired to be different, then new tables can be generated which take into account the combination of the different condition, P99.9/Mean and the different location and width of the desired error band.

If the first method is selected (Table 8): By selecting the error band, the E2E percentile of interest, and how many segments are in the network of interest, the service provider uses the table to lookup the percentile used for all segments in the network.

If the second method is selected (Table 9): By selecting the error band, the interested E2E percentile of interest, and how many segments are in the network of interest, the service provider uses the table to lookup two percentiles. The Higher percentile is used for the largest delay network, the Other percentile is used for other segmented networks.

If the third method is selected (Table 10): By selecting the error band, the E2E percentile of interest, and how many segments are in the network of interest, the service provider uses the table to lookup n percentiles for n segmented networks. The Highest percentile is used for the largest delay network, the next highest percentile is used for the second largest delay network, the lowest percentile is used for the lowest delay network.

Figure 4:
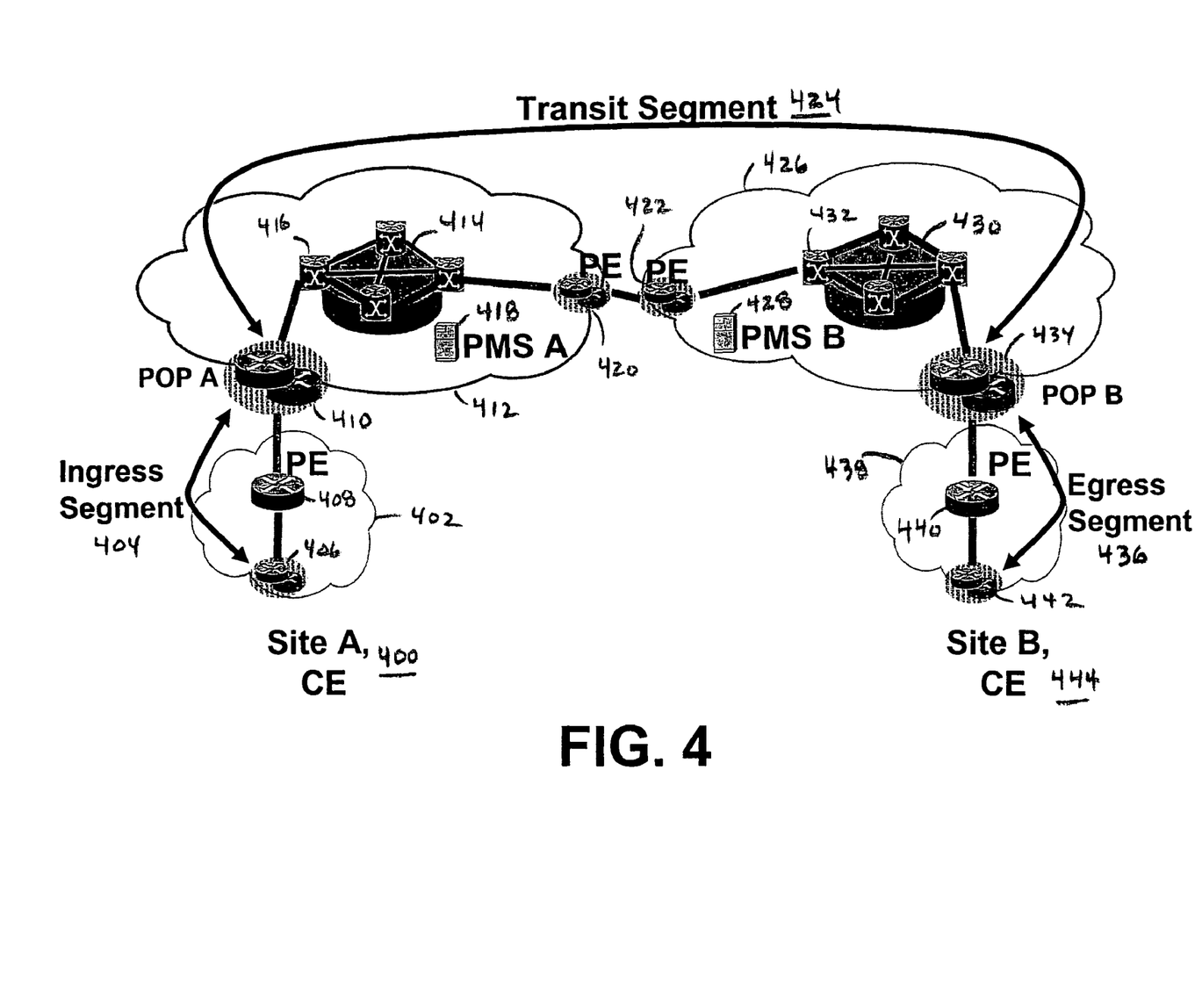
FIG. 4 is a schematic diagram illustrating delay measurements in a network configuration having three network segments in accordance with the present approach.

Referring now to FIG. 4, an example application of the present estimation approach is now described. In the network shown, there are three network segments: ingress segment 404, transit segment 424 and egress segment 436. The ingress segment includes access network 402 that includes customer edge router 406 and peering point 408. The egress segment includes access network 438 that includes customer edge router 442 and peering point 440. Sites A 400 and B 444, respectively, connect through the network for a particular type of IP communications service.

The transit segment includes regional networks 412, 426 that connected through peering points 420, 422. Regional network 412 includes a mesh 414 of various nodes 416 connected to the peering point 420 and a point of presence (POP) A 410 that is located at the edge of the regional network and connected in turn to ingress segment 404. Likewise, regional network 426 includes a mesh 430 of various nodes 432 connected to the peering point 422 and a point of presence (POP) B 434 that is located at the edge of the regional network and connected in turn to egress segment 436. Both regional networks include respective performance management systems (PMS) A 418, B 428.

The customer edge routers 406, 442, POP A 410, POP B 434 and peering points 420, 422 are able to serve as measurement points and are embodied as dedicated measurement shadow routers. In an embodiment, the shadow router functionality is based on the IP SLA capabilities described herein above. In other embodiments, the measurement points may use other measurement devices to measure one way delay.

A system for estimating end-to-end delay performance at an end-to-end delay percentile of interest for a network having two or more network segments includes at least three measurement points, one measurement point located at one end of the network, another measurement point located at the other end of the network, and each of the other measurement points located between neighboring network segments, each measurement point configured to send or receive a number of one-way delay probes to or from a neighboring measurement point; and a performance management system which derives a delay performance level for each network segment at a corresponding network segment delay percentile based on measurement results of the delay probes received from the measurement points, and which sums the derived delay performance levels to provide an estimate value indicative of end-to-end delay performance.

A description of a methodology for providing the estimate of end-to-end delay performance in the context of this network is now provided.

In an example service scenario using the network configuration shown in FIG. 4, assume that SP A sells service to a customer which has two sites, with a service level agreement that includes an E2E metric dependent upon the 99.9 percentile, and SP A wishes to obtain an E2E estimate based upon segment measurements. The steps in the operations sequence are as follows:

PMS A 418 initiates a delay measurement set between POP A 410 and CE for Site A 406, and another delay measurement set between POP A 410 and POP B 434, and derives the 98.5 percentiles for each;

PMS B 428 initiates a delay measurement set between POP B 434 and CE for Site B 442, and derives the 98.5 percentile;

PMS A 418 retrieves the 98.5 percentile measurement between POP B 434 and CE for Site B 442 from PMS B 428;

PMS A 418 sums the three segment 98.5 percentiles to obtain an estimate of the 99.9 E2E percentile.

For a network that includes an ingress segment, an egress segment and at least one transit segment, measuring the estimated end-to-end delay performance may include for the ingress segment, initiating a ingress delay measurement set between a first point of presence router at a transit segment connected to the ingress segment and a first customer edge router at the ingress segment, and deriving the measured delay performance level for the ingress segment at the corresponding network segment delay percentile from the ingress delay measurement set; and for the egress segment, initiating an egress delay measurement set between a second point of presence router at a transit segment connected to the egress segment and a second customer edge router at the egress segment, and deriving the measured delay performance level for the egress segment at the corresponding network segment delay percentile from the egress delay measurement set. For the transit segment, the measurement may include initiating a transit delay measurement set between the first point of presence router and the second point of presence router, and deriving the measured delay performance level for the transit segment at the corresponding network segment delay percentile from the transit delay measurement set.

The steps may be examined in more detail. PMS A directs POP A to periodically send 1) a set of one-way delay probes (1,000) to POP B and obtain results (1,000) from POP B and 2) a set of one-way delay probes (1,000) to CE A and obtain results (1,000) from CE A. In parallel, PMS B directs POP B to periodically send a set of one-way delay probes (1,000) to CE B and obtain results (1,000) from CE B. In parallel, PMS A retrieves measurements (1,000) from POP A. In parallel, PMS B retrieves measurements (1,000) from POP B.

At the end of each period, PMS A does a lookup based upon the desired percentile to be estimated (99.9) and the number of segments (3) between end points, and sends a request to PMS B for the segment percentile (98.5) desired.

PMS B then "stack ranks" the (1,000) POP B to CE B measurements, discards the highest "(1—percentile desired) *total number of measurements" ((1—98.5)*1,000) measured values (150), and provides the next highest value (151st) to PMS A. In parallel, PMS A "stack ranks" the (1,000) POP A to CE A measurements and discards the highest "(1—percentile desired)*total number of measurements" ((1—98.5)*1,000) measured values (150), and stores the value of the next highest value (151st). In parallel, PMS A "stack ranks" the (1,000) POP A to CE A measurements and discards the highest "(1—percentile desired)*total number of measurements" ((1—98.5)*1,000) measured values (150), and stores the value of the next highest value (151st).

PMS A then computes an estimate of the desired E2E percentile by addition of the values corresponding to the segment percentile (98.5) of the three segments. It should be understood that the number of 1,000 measurements above is an example.

It should be understood that while the initiation of delay measurements as described in the foregoing example configuration as being directed by two different performance management systems, in other embodiments the initiation of delay measurements may be directed by a single PMS. Any PMS in the network may be configured to direct the initiation of delay measurements and/or the summing of measured performance levels.

The PMS can be a generic computing system programmed to include a measurement module that directs delay measurements by measurement points in the network segments, receives delay measurements for each of the network segments, and derives delay performance levels based on the received delay measurements; and a concatenation module that sums the derived delay performance levels to provide an estimate value indicative of end-to-end delay performance for an end-to-end delay percentile of interest.

The method of the present approach can be implemented by a computer running software stored on a computer readable medium.

The foregoing example configuration has described active measurement whereby active probes are sent for one-way delay measurement. In other embodiments, passive measurement can be used. The passive measurement approach takes advantage of the normal data flow in the network. In particular, a timestamp is associated with the time that a packet leaves a source and the time that it arrives at a destination. The one-way delay can be calculated or derived using the timestamp from the source and timestamp from the destination.

The examples described above pertain to one-way delay. Round-trip delay can be derived as an extension of this approach, simply by considering the network segments in each direction. For example, if there are three network segments for a particular network, then round-trip is modeled as a six segment network (i.e., three network segments from source to destination and three network segments from destination to source). In that case, the round-trip delay is derived by summing the particular percentiles of the six network segments.

While this invention has been particularly shown and described with references to preferred embodiments thereof, it will be understood by those skilled in the art that various changes in form and details may be made therein without departing from the scope of the invention encompassed by the appended claims.

What is claimed is:

1. A computerized method of estimating end-to-end delay performance for a network having two or more network segments, the method comprising:
    selecting an end-to-end delay percentile of interest at a performance management system (PMS);
    selecting a network segment delay percentile for each network segment from a pre-computed look-up table based on the selected end-to-end delay percentile of interest, each selected network segment delay percentile being different from the selected end-to-end delay percentile of interest;
    receiving measurements of a delay performance level for each network segment at the corresponding selected network segment delay percentile; and
    concatenating the measured performance levels at the PMS by summing to provide an estimate value indicative of end-to-end delay performance, at the end-to-end delay percentile of interest.

2. The method of claim 1 wherein selecting the network segment delay percentile for each network segment includes selecting the same network segment delay percentile for all network segments.

3. The method of claim 1 wherein selecting the network segment delay percentile for each network segment includes selecting the network segment delay percentile based on the total number of network segments.

4. The method of claim 1 wherein selecting the network segment delay percentile for each network segment includes selecting a first network segment delay percentile for a particular network segment having the largest delay relative to the other network segments and selecting a second network segment delay percentile for other segments.

5. The method of claim 1 wherein selecting the network segment delay percentile for each network segment includes selecting an error band associated with error between the estimate value and the actual end-to-end delay, with selection of network segment delay percentiles based upon the selected error band.

6. The method of claim 1 wherein the delay performance measurement is a measure of Internet Protocol packet delay variation.

7. The method of claim 1 wherein the delay performance measurement is one-way.

8. The method of claim 1 wherein the delay performance measurement is round-trip.

9. The method of claim 1 further comprising scoring an error between the estimate value and the actual end-to-end delay.

10. The method of claim 1 wherein the network includes an ingress segment and an egress segment, and wherein measuring includes:
    for the ingress segment, initiating a ingress delay measurement set between a first point of presence router and a first customer edge router at the ingress segment, and deriving the measured delay performance level for the ingress segment at the corresponding selected network segment delay percentile from the ingress delay measurement set; and
    for the egress segment, initiating an egress delay measurement set between a second point of presence router and a second customer edge router at the egress segment, and deriving the measured delay performance level for the egress segment at the corresponding selected network segment delay percentile from the egress delay measurement set.

11. The method of claim 10 wherein the network includes a transit segment between the ingress segment and the egress segment and receiving measurements further includes:
    for the transit segment, initiating a transit delay measurement set between the first point of presence router and the second point of presence router, and deriving the measured delay performance level for the transit segment at the corresponding selected network segment delay percentile from the transit delay measurement set.

12. The method of claim 10 wherein the delay measurement sets each comprise a number of one-way delay probes.

13. The method of claim 10 wherein concatenating includes summing the derived delay performance levels at a performance management system.

14. The method of claim 1 wherein the delay performance measurements are derived from timestamping user data at multiple measurement points.

15. Apparatus for estimating end-to-end delay performance for a network having two or more network segments, the apparatus comprising:

means for selecting an end-to-end delay percentile of interest;

means for selecting a network segment delay percentile for each network segment based on the selected end-to-end delay percentile of interest, each selected network segment delay percentile being different from the selected end-to-end delay percentile of interest;

means for receiving measurements of a delay performance level for each network segment at the corresponding selected network segment delay percentile; and means for concatenating the measured performance levels by summing to provide an estimate value indicative of end-to-end delay performance, at the end-to-end delay percentile of interest.

16. The apparatus of claim 15 wherein the delay measurements are derived from a number of one-way delay probes.

17. The apparatus of claim 15 wherein the delay measurements are derived from timestamping user data at multiple measurement points.

18. A system for estimating end-to-end delay performance for a network having two or more network segments, the system comprising:
   at least three measurement points, one measurement point located at one end of the network, another measurement point located at the other end of the network, and each of the other measurement points located between neighboring network segments, each measurement point configured to send or receive a number of one-way delay probes to or from a neighboring measurement point; and
   a performance management device which is configured to select an end-to-end delay percentile of interest and select a network segment delay percentile, different from the selected end-to-end delay percentile of interest, for each network segment from a pre-computed look-up table based on the selected end-to-end delay percentile of interest, which derives a delay performance level for each network segment at the corresponding selected network segment delay percentile based on measurement results of the delay probes received from the measurement points, and which sums the derived delay performance levels to provide an estimate value indicative of end-to-end delay performance, at the end-to-end delay percentile of interest.

19. The system of claim 18 wherein each measurement point comprises a dedicated measurement shadow router.

20. The system of claim 18 wherein the same network segment delay percentile is selected for all network segments.

21. The system of claim 18 wherein the network segment delay percentile is selected based on the total number of network segments.

22. The system of claim 18 wherein a first network segment delay percentile is selected for a particular network segment having the largest delay relative to the other network segments and a second network segment delay percentile is selected for other segments.

23. The system of claim 18 wherein an error band associated with error between the estimate value and the actual end-to-end delay is selected and selection of the network segment delay percentiles is based upon the selected error band.

24. The system of claim 18 wherein the delay performance measurement is a measure of Internet Protocol packet delay variation.

25. The system of claim 18 wherein the delay performance measurement is one-way.

26. The system of claim 18 wherein the delay performance measurement is round-trip.

27. The system of claim 18 wherein the performance management device is further configured to score an error between the estimate value and the actual end-to-end delay.

28. A performance management device for estimating end-to-end delay performance for a network having two or more network segments, the performance management system comprising:
   a first selection module that selects an end-to-end delay percentile of interest;
   a second selection module that selects a network segment delay percentile for each network segment from a pre-computed look-up table based on the selected end-to-end delay percentile of interest, each selected network segment delay percentile being different from the selected end-to-end delay percentile of interest;
   a measurement module that directs delay measurements by measurement points in the network segments, receives delay measurements for each of the network segments, and derives delay performance levels at corresponding selected network segment delay percentiles based on the received delay measurements; and
   a concatenation module that sums the derived delay performance levels to provide an estimate value indicative of end-to-end delay performance, at the end-to-end delay percentile of interest.

29. The performance management device of claim 28 wherein the same network segment delay percentile is selected for all network segments.

30. The performance management device of claim 28 wherein the network segment delay percentile is selected based on the total number of network segments.

31. The performance management device of claim 28 wherein a first network segment delay percentile is selected for a particular network segment having the largest delay relative to the other network segments and a second network segment delay percentile is selected for other segments.

32. The performance management device of claim 28 wherein an error band associated with error between the estimate value and the actual end-to-end delay is selected and selection of the network segment delay percentiles is based upon the selected error band.

33. The performance management device of claim 28 wherein the delay performance measurement is a measure of Internet Protocol packet delay variation.

34. The performance management device of claim 28 wherein the delay performance measurement is one-way.

35. The performance management device of claim 28 wherein the delay performance measurement is round-trip.

36. The performance management device of claim 28 further configured to score an error between the estimate value and the actual end-to-end delay.

37. A computer program product for estimating end-to-end delay performance for a network having two or more network segments, the computer program product having a non-transitory computer readable medium including computer program instructions recorded thereon that, when executed on a computer processor, cause the processor to:
   select an end-to-end delay percentile of interest
   select a network segment delay percentile for each network segment from a pre-computed look-up table based on the selected end-to-end delay percentile of interest, each selected network segment delay percentile being different from the selected end-to-end delay percentile of interest;
   receive measurements of a delay performance level for each network segment at the corresponding selected network segment delay percentile; and concatenate the measured performance levels by summing to provide an estimate value indicative of end-to-end delay performance, at the end-to-end delay percentile of interest.

38. The computer program product of claim 37 wherein selecting the network segment delay percentile for each network segment includes selecting the same network segment delay percentile for all network segments.

39. The computer program product of claim 37 wherein selecting the network segment delay percentile for each network segment includes selecting the network segment delay percentile based on the total number of network segments.

40. The computer program product of claim 37 wherein selecting the network segment delay percentile for each network segment includes selecting a first network segment delay percentile for a particular network segment having the largest delay relative to the other network segments and selecting a second network segment delay percentile for other segments.

41. The computer program product of claim 37 wherein selecting the network segment delay percentile for each network segment includes selecting an error band associated with error between the estimate value and the actual end-to-end delay, with selection of network segment delay percentiles based upon the selected error band.

* * * * *